(12) United States Patent
Wang

(10) Patent No.: US 6,212,897 B1
(45) Date of Patent: Apr. 10, 2001

(54) COOLING FAN WITH SPRAY FUNCTION

(76) Inventor: Pierce Wang, No. 46, Alley 26, Lane 667, Chung-Shan Rd., Shen-Kang Hsiang, Taichung Hsien (TW)

(*) Notice: Subject to any disclaimer, the term of this patent is extended or adjusted under 35 U.S.C. 154(b) by 0 days.

(21) Appl. No.: 09/521,894

(22) Filed: Mar. 9, 2000

(51) Int. Cl.$^7$ .................................................. F28D 5/00
(52) U.S. Cl. .............................. 62/314; 62/304; 261/73.1
(58) Field of Search .................... 62/304, 314; 261/78.1, 261/DIG. 3, DIG. 43, 62

(56) References Cited

U.S. PATENT DOCUMENTS

| | | | |
|---|---|---|---|
| 1,357,535 | * 11/1920 | White | 261/30 |
| 1,586,997 | * 6/1926 | Hull | 261/30 |
| 2,238,120 | * 4/1941 | Launder | 261/30 |
| 2,653,803 | * 9/1953 | Baner | 261/30 |
| 5,338,495 | * 8/1994 | Steiner et al. | 261/28 |
| 6,086,053 | * 7/2000 | Natschke et al. | 261/30 |

* cited by examiner

*Primary Examiner*—Corrine McDermott
*Assistant Examiner*—Melvin Jones

(57) ABSTRACT

A cooling fan with spray function mainly comprises a plurality of T-shaped jet couplings, a single-way jet coupling, a plurality of hose segments to be connected with the jet couplings, and a hose segment with a coupling T for connection with the faucet and a first T-shaped jet coupling to form a circular channel for water spray. After water enters a through hole of a nozzle via a blowhole, it will flow along grooves on a rotor to drive the rotor to rotate and thereby spray foggy speedy helical droplets out of a spout in the nozzle for enhancing cooling effect or watering flowers.

1 Claim, 6 Drawing Sheets

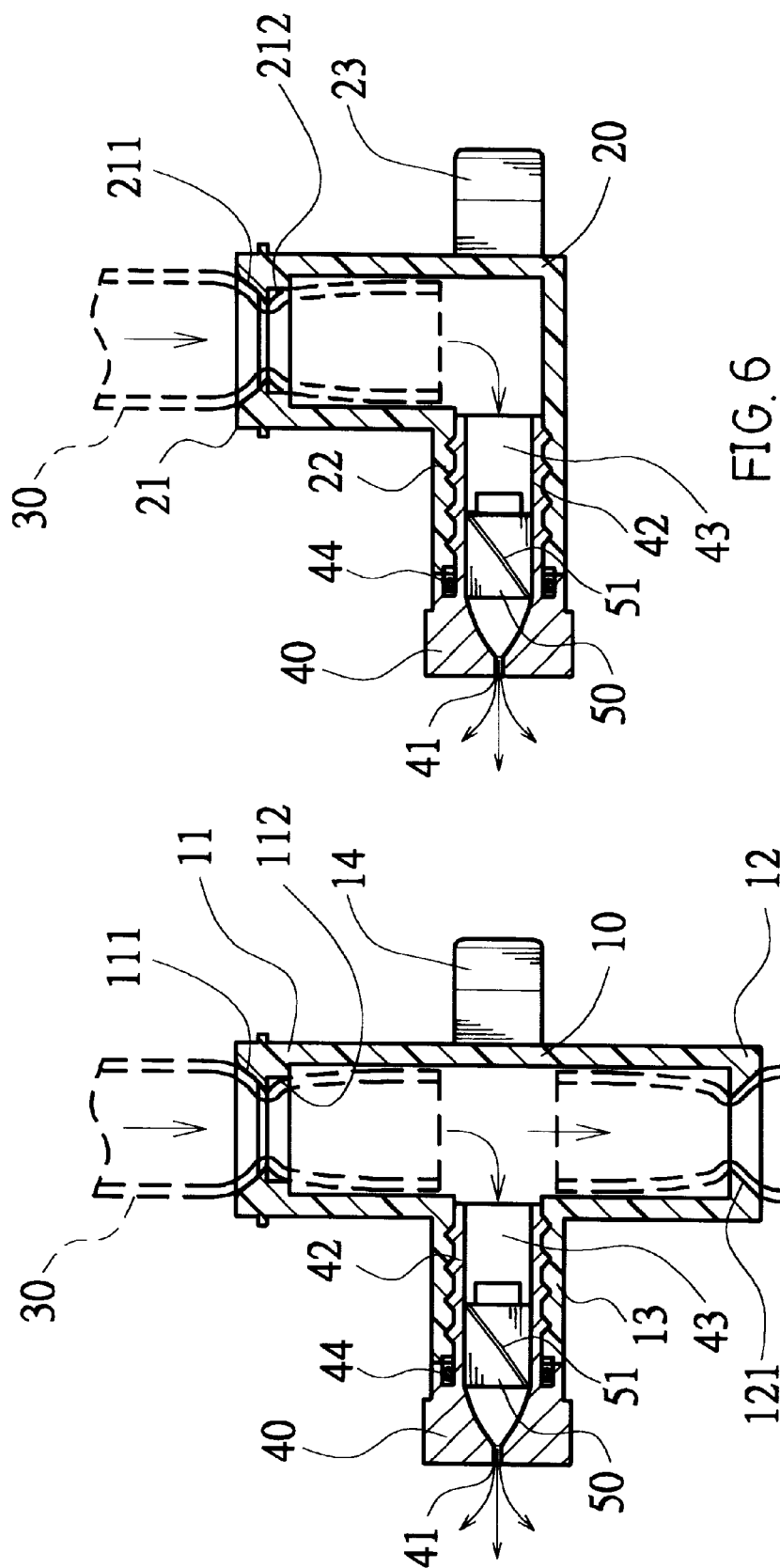

COOLING FAN WITH SPRAY FUNCTION

BACKGROUND OF THE INVENTION

This invention relates to a cooling fan, particularly to a cooling fan that can spray rotating foggy droplets accompanying airflow for enhancing cooling effect.

A conventional fan shown in FIG. 1 comprises a plurality of leaf blades to be driven by a motor for producing cooling airflow. However, in a sultry dry day, the conventional fan can hardly cool people by sucking hot air and blowing the same, and similarly, a nominal strength-adjustable cooling fan doesn't work well for cooling purpose under that weather conditions.

In view of above said defects, this invention is proposed to provide a cooling fan equipped with a hose, which is connected to a plurality of nozzles with its one end, and the other is coupled to a faucet, so that when the leaf blades rotate to blow airflow, the nozzles will spray rotating foggy droplets meanwhile to thereby enhance cooling effect.

SUMMARY OF THE INVENTION

The primary object of this invention is to provide a cooling fan equipped with a water tube coupled with a plurality of nozzles to thereby spray rotating foggy droplets accompanying wind to enhance cooling effect.

For realizing above said object, this invention comprises a plurality of T-shaped jet couplings, a single-way jet coupling, a plurality of hose segments to be connected with the jet couplings, and a hose segment with a coupling T for connection with the faucet and a first T-shaped jet coupling to form a circular channel for water spray. After the water enters a through hole of a nozzle via a blowhole, it will flow along grooves on a rotor to drive the rotor to rotate and thereby spray foggy speedy helical droplets out of a spout in the nozzle for enhancing cooling effect or watering flowers.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention to be made later are described briefly as follows in which:

FIG. 5 is a cutaway sectional view taken along line 5—5 in FIG. 2;

FIG. 6 is a cutaway sectional view taken along line 6—6 in FIG. 2; and

DETAILED DESCRIPTION OF THE PREFERRED EMBODIMENT

Figure 1:
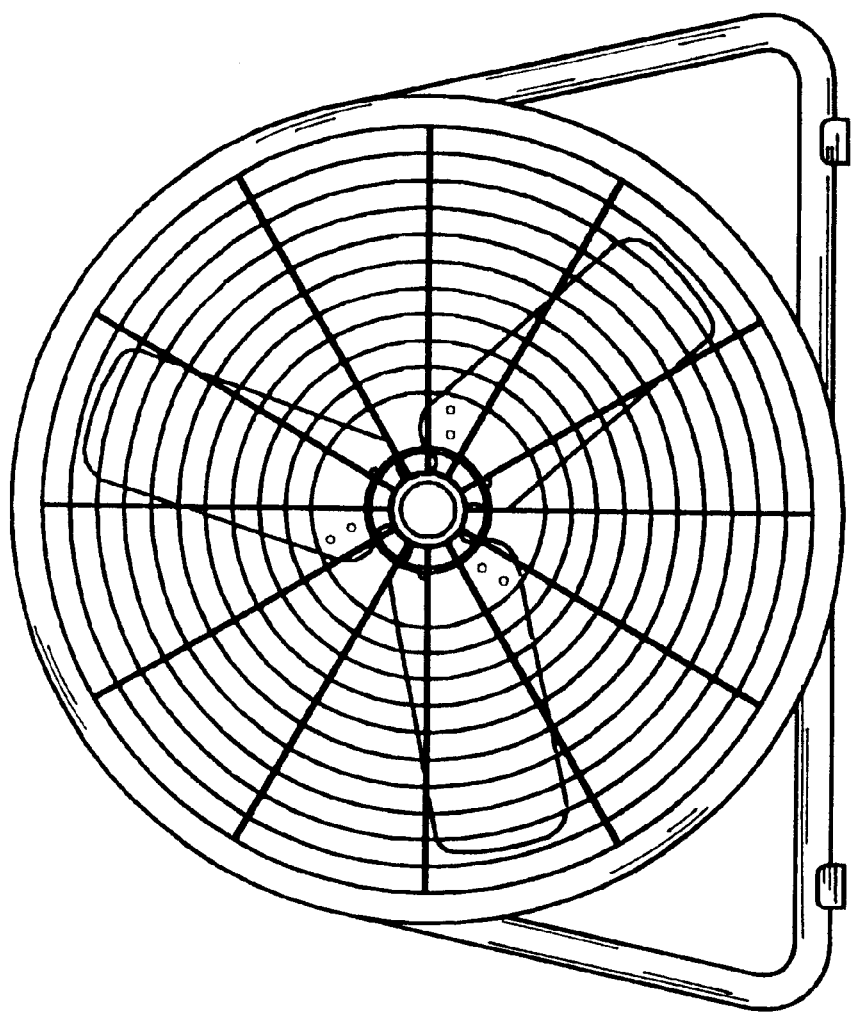
FIG. 1 is a schematic front view of a conventional cooling fan.
Figure 2:
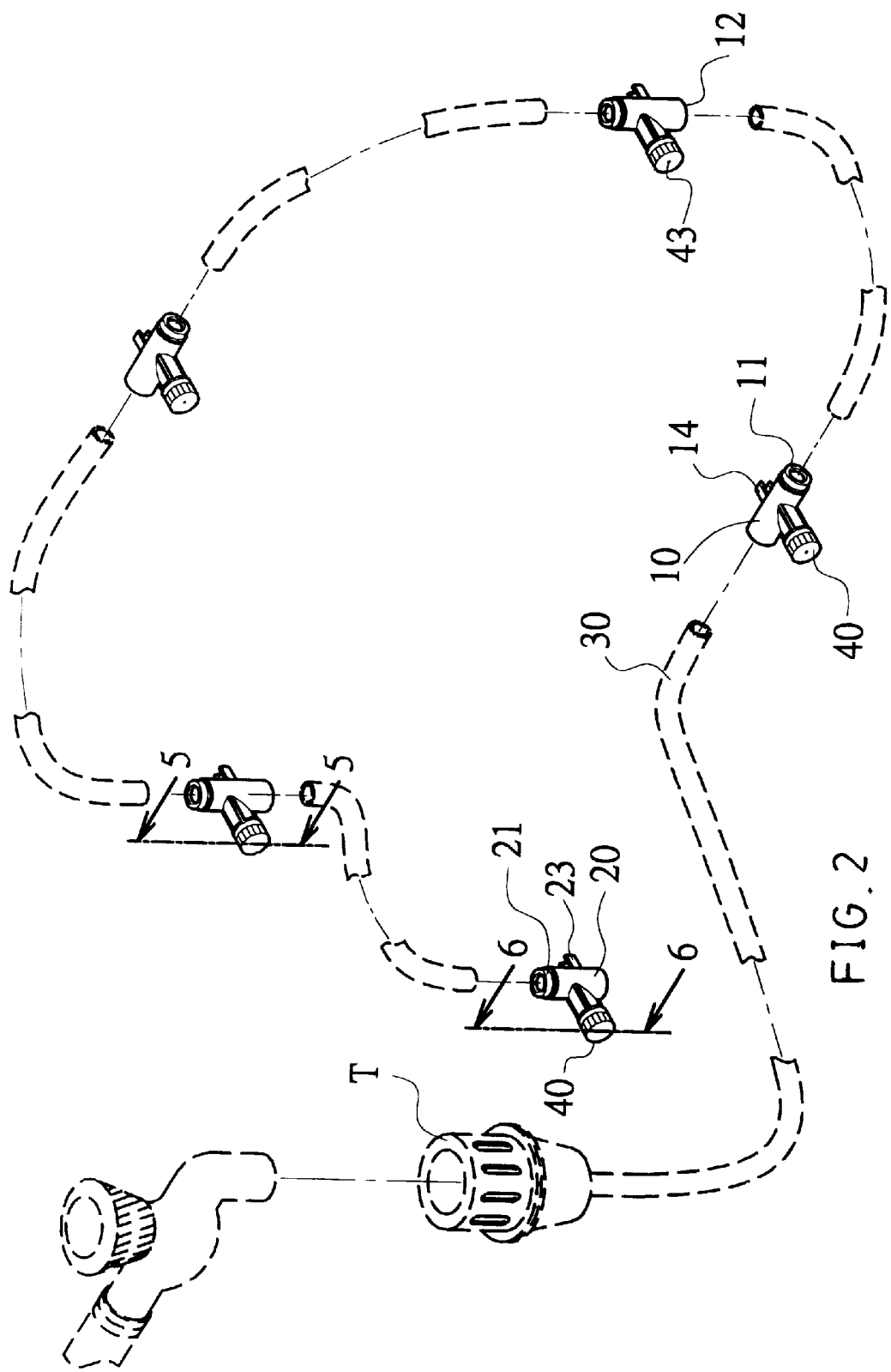
FIG. 2 is a three-dimensional exploded view of this invention.
Figure 3:
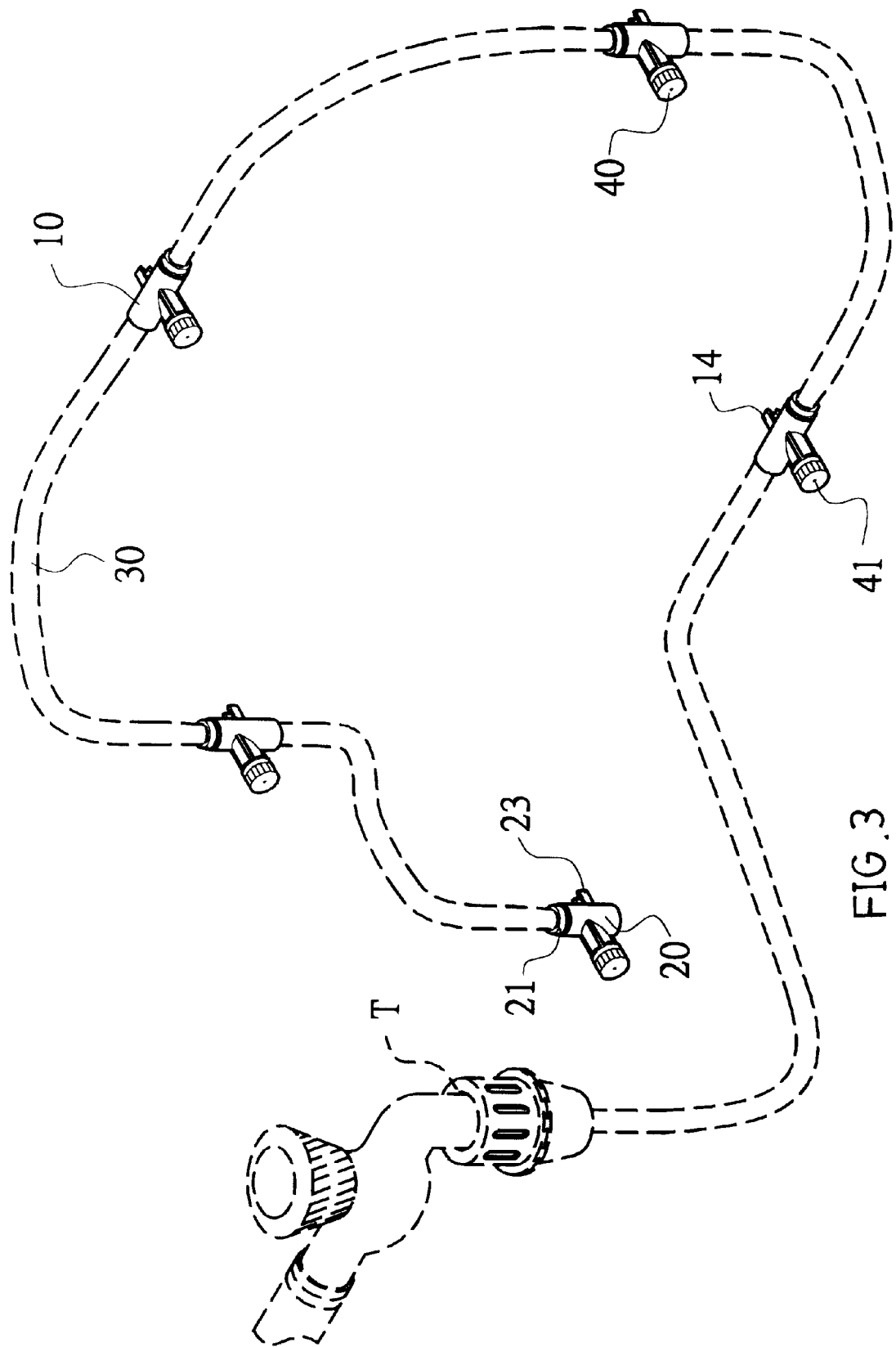
FIG. 3 is a three-dimensional assembled view of this invention.
Figure 4:
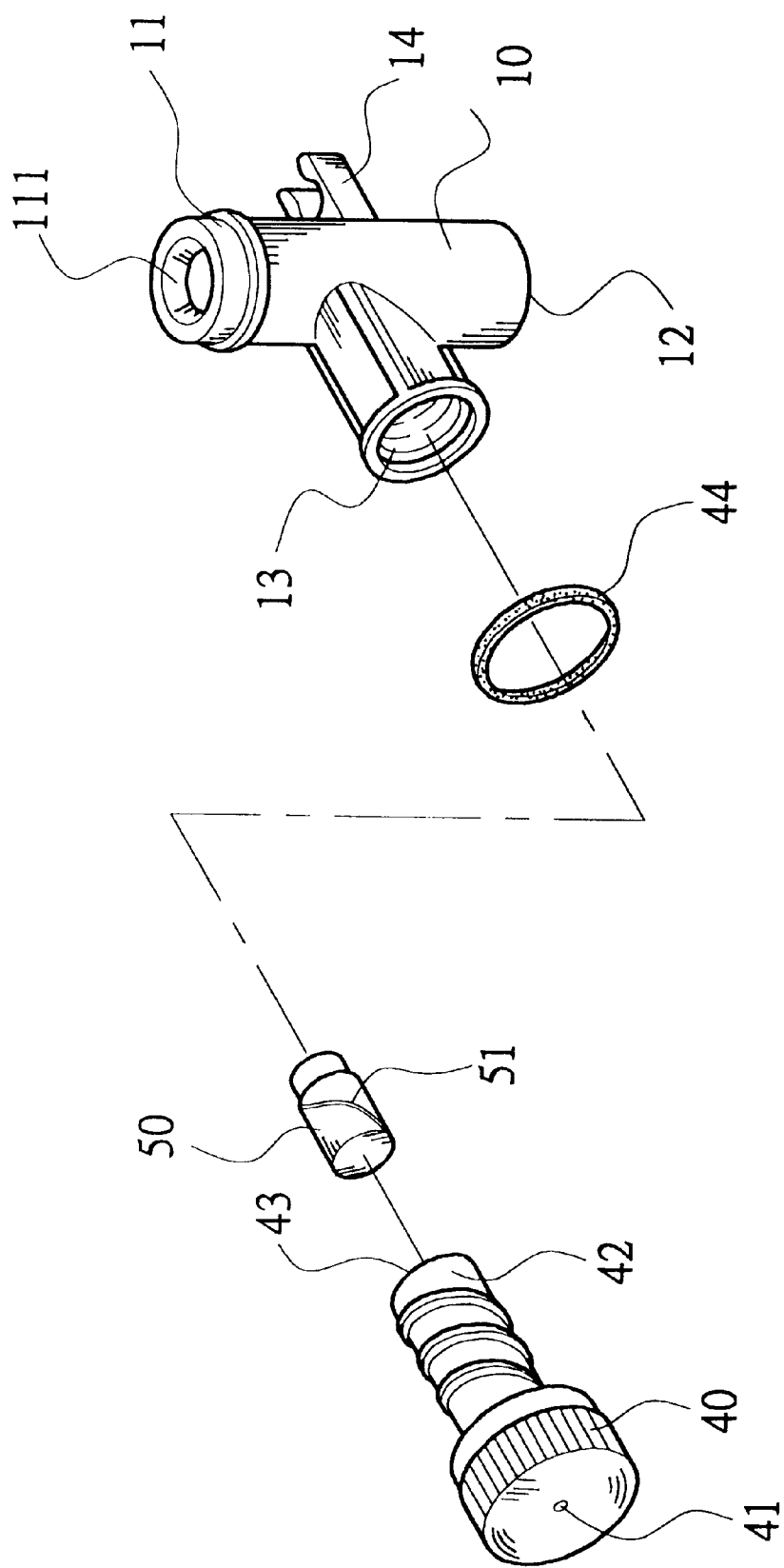
FIG. 4 is a three-dimensional exploded view of a T-shaped jet coupling of this invention.

As shown in FIG. 2 through FIG. 7, this invention mainly comprises a plurality of T-shaped jet couplings 10, a single-way jet coupling 20, a plurality of hose segments 30 connected between the T-shaped jet couplings 10 and the single-way jet coupling 20, and a hose segment 30 having a coupling T at its one end connected to a first T-shaped coupling 10 to form a circular channel for water spray.

One end of the T-shaped jet coupling 10 is a water inlet 11 for inserting a hose segment 30 to allow water to flow in the T-shaped jet coupling 10, and the other end is a water outlet 12 for connecting with another hose segment 30. A tapped blowhole 13 is protrusively disposed at lateral center position of the T-shaped jet coupling 10 between the water inlet 11 and the water outlet 12, and a clamp fastener 14 is arranged at an opposite side against the blowhole 13 for clamping at a mantle SI of the cooling fan S. A slanting inwards annular tooth 111 and an annular flange 112 are formed in the inner wall at the end of the water inlet 11 for fixedly jointing with a plugged hose segment 30. Similarly, a slanting inwards annular tooth 121 is formed at the end of the water outlet 12.

The single-way jet coupling 20 has a water inlet 21 only at its one end, the other is closed, and a tapped blowhole 22 is protrusively disposed at its circumferential rim. At an opposite position against the blowhole 22, a clamp fastener 23 is disposed for clamping at the mantle S1 of the cooling fan S. A slanting inwards annular tooth 211 and an annular flange 212 are formed in the inner wall at the end of the water inlet 21 for fixedly jointing with a plugged hose segment 30.

A plurality of helical nozzles 40, wherein a spout 41 is reserved in center position of a end face in each nozzle 40, and the other end is a threaded protrusive rod 42 for screw-jointing with the blowhole 13, 22 in each coupling; a through hole 43 is formed in the protrusive rod 42 to communicate with the spout 41; the caliber of the through hole 43 is larger than that of the spout 41 so that when water is sprayed from the spout 41 via the through hole 43, it is accelerated to become foggy droplets; and, a leakage-proof ring 44 is disposed on the protrusive rod 42 of the nozzle 40.

A rotor 50 is placed in the through hole 43 of the nozzle 40, wherein a plurality of helical grooves 51 is formed on circumferential face of the rotor 50 so that when water flows through the grooves 51, the rotor 50 is driven to rotate in the through hole 43 of the nozzle 40 to form a plurality of helical water columns.

In short, the objects of this invention are realized by using a plurality of hose segments 30 in connection with a water inlet 11 and a water outlet 12 of each T-shaped jet coupling 10, and finally with an water inlet 21 of a single-way jet coupling 20, and using a hose segment 30 having a coupling T to connect with a faucet and a first jet coupling 10 to form a circular channel for water spray. Besides, An annular tooth 111, 121, 211 at end of each coupling can fixedly hold the hose segment 30, as shown in FIG. 5, 6, to prevent it from escaping.

In operation, water from the faucet enters the hose segment 30 with a coupling T, then the inlet 11 of T-shaped jet coupling 10, one part of the water flows through the outlet 12 to enter an inlet 11 of another T-shaped jet coupling 10 via another hose segment 30 or enter an inlet 21 of the single-way jet coupling 20, while another part of the water flows in the through hole 43 of the nozzle 40 via the blowhole 13, then goes along the helical grooves 51 of the rotor 50 to push the rotor 50 to rotate. Finally, the water is sprayed through the spout 41 of the nozzle 40 to form foggy speedy helical droplets as shown in FIG. 7.

As to operation of the single-way jet coupling 20, after the water enters this coupling via the blowhole 22 to reach the through hole 43 of the nozzle 40, it will go along the helical grooves 51 of the rotor 50 to push the rotor 50 to rotate. Then the water is sprayed through the spout 41 of the nozzle 40 to form foggy speedy helical droplets as described above.

Figure 7:
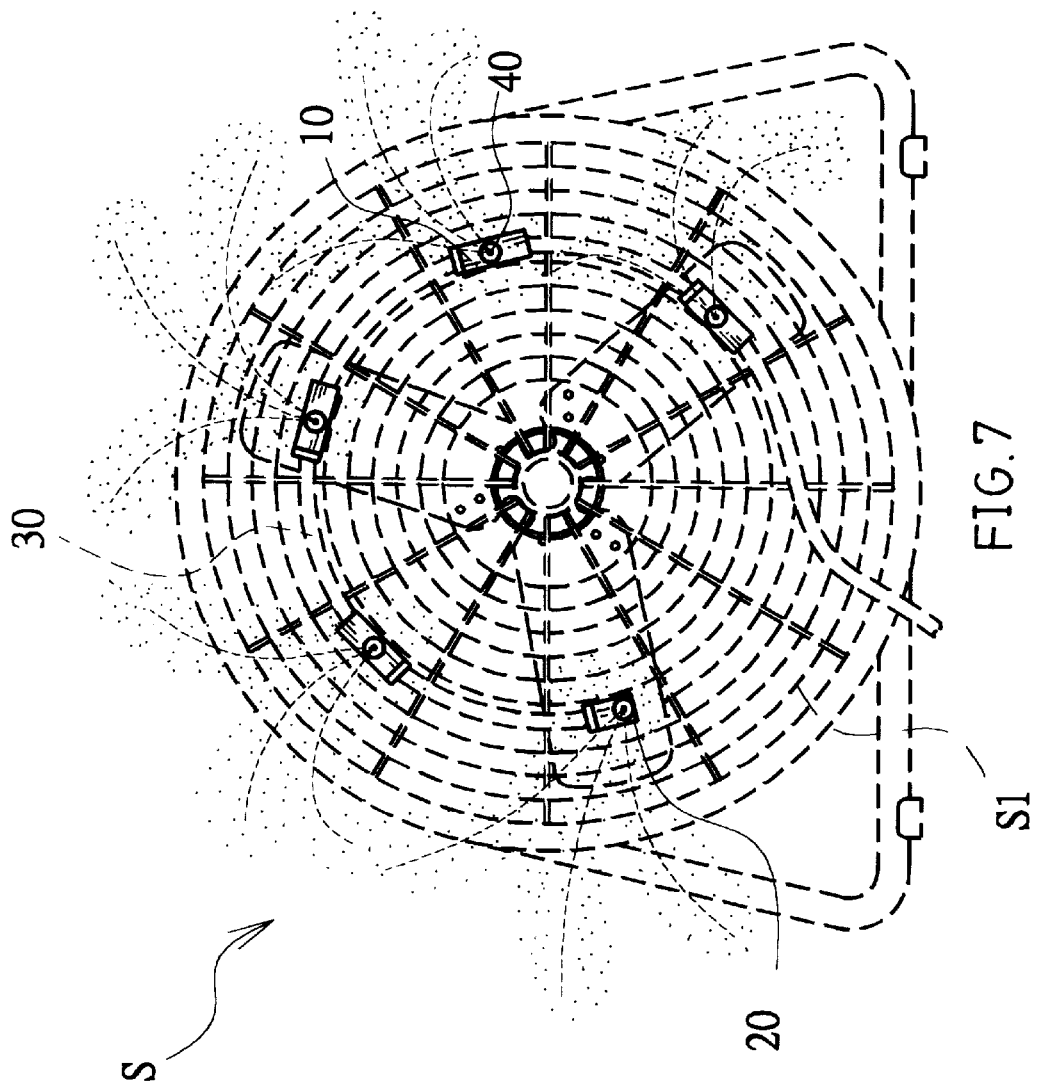
FIG. 7 is a schematic view of an embodiment of this invention.

As mentioned above, the clamp fastener 14, 23 of each coupling is clamped at the mantle S1 of the cooling fan S as shown in FIG. 7, the sprayed droplets are blown away accompanying airflow created by the cooling fan S to enhance cooling effect or water flowers alternatively.

What is claimed is:

1. A cooling fan with spray function, comprising:

a plurality of T-shaped jet couplings, wherein one end of each said T-shaped jet coupling is a water inlet for inserting a hose segment to allow water to flow in the T-shaped jet coupling, and the other end is a water outlet for connecting with another hose segment; a tapped blowhole is protrusively disposed at lateral center position of said T-shaped jet coupling between said water inlet and said water outlet; a clamp fastener is arranged at an opposite side against said blowhole for clamping at a mantle S1 of a cooling fan S; a slanting inwards annular tooth and an annular flange are formed in the inner wall at the end of said water inlet for fixedly jointing with a plugged hose segment; and similarly, a slanting inwards annular tooth is formed at the end of said water outlet;

a single-way jet coupling having a water inlet at one end with the other end closed, wherein a tapped blowhole is protrusively disposed at its circumferential rim; at an opposite position against the blowhole, a clamp fastener is disposed for clamping at the mantle S1 of the cooling fan S; a slanting inwards annular tooth and an annular flange are formed in the inner wall at the end of said water inlet for fixedly jointing with a plugged hose segment;

a plurality of helical nozzles, wherein a spout is reserved in center position of a end face in each said nozzle, and the other end is a threaded protrusive rod for screw-jointing with said blowhole in each coupling; a through hole is formed in said protrusive rod to communicate with said spout; the caliber of said through hole is larger than that of said spout so that when water is sprayed from said spout via said through hole, it is accelerated to become foggy speedy droplets; and, a leakage-proof ring is disposed on said protrusive rod of said nozzle; and a plurality of rotors, wherein each rotor is placed in said through hole of said nozzle; a plurality of helical grooves is formed on circumferential face of said rotor so that when water flows through said grooves, said rotor is driven to rotate in said through hole of said nozzle to form a plurality of helical water columns.

* * * * *